US006193292B1

(12) United States Patent
Maffeis et al.

(10) Patent No.: US 6,193,292 B1
(45) Date of Patent: Feb. 27, 2001

(54) PNEUMATIC GRIPPER WITH THREE SELF-CENTERING JAWS

(75) Inventors: Giuseppe Maffeis; Giuseppe Bellandi, both of Roncadelle (IT)

(73) Assignee: Gimatic S.p.A. (IT)

( * ) Notice: Subject to any disclaimer, the term of this patent is extended or adjusted under 35 U.S.C. 154(b) by 0 days.

(21) Appl. No.: 09/293,741

(22) Filed: Apr. 16, 1999

(30) Foreign Application Priority Data

Apr. 20, 1998 (IT) ........................................... BS980039 U

(51) Int. Cl.[7] ................................................ B25J 15/10

(52) U.S. Cl. ........................................ 294/88; 294/119.1

(58) Field of Search ............................ 294/88, 93, 115, 294/119.1, 902; 269/25, 27, 32, 34; 414/741, 751; 901/37, 39

(56) References Cited

U.S. PATENT DOCUMENTS 4,607,873 * 8/1986 Nusbaumer et al. ......... 294/119.1 X
4,621,853 * 11/1986 Fink ...................................... 294/88
4,729,588 * 3/1988 Kratzer .................................. 294/88
4,892,344 * 1/1990 Takada et al. ................ 294/119.1 X
4,913,481 * 4/1990 Chin et al. .................... 294/119.1 X
6,092,848 * 7/2000 Maffeis et al. ................ 294/119.1 X

* cited by examiner

*Primary Examiner*—Johnny D. Cherry
(74) *Attorney, Agent, or Firm*—McGlew and Tuttle, P.C.

(57) ABSTRACT

The present utility model pertains to a pneumatic gripper with a body (11), which comprises two superimposed, complementary elements (16, 17), which are made of metal, and two additional supports (18, 19) molded in plastic material which are placed and clamped together between the two superimposed elements. The two additional supports (18, 19) define, together, at least one guiding seat (28) for the rod of the piston, an accommodation for a seal (29) for sealing around the rod and seats (18', 19') for the pins (30) carrying the elbow-shaped relay rods (15), which, starting from the rod of the piston, control the jaws.

13 Claims, 1 Drawing Sheet

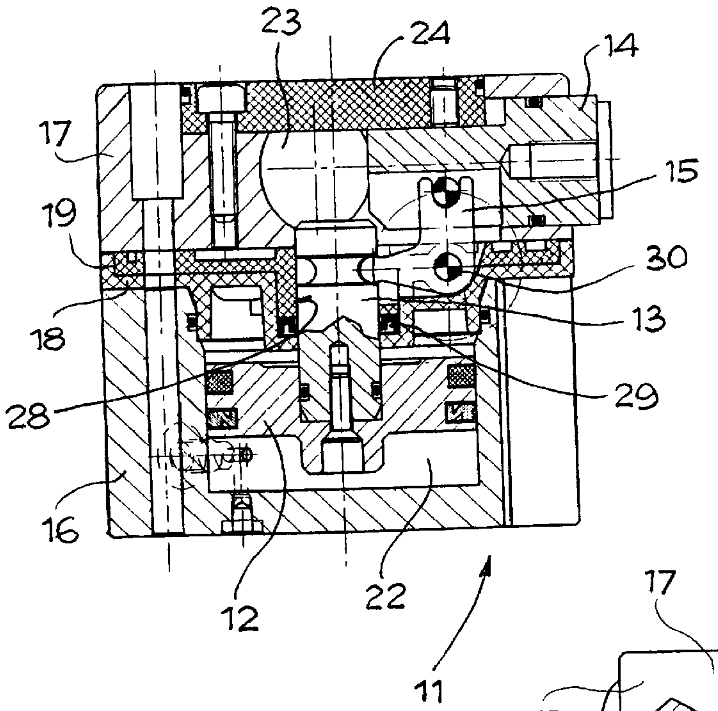
Fig. 1
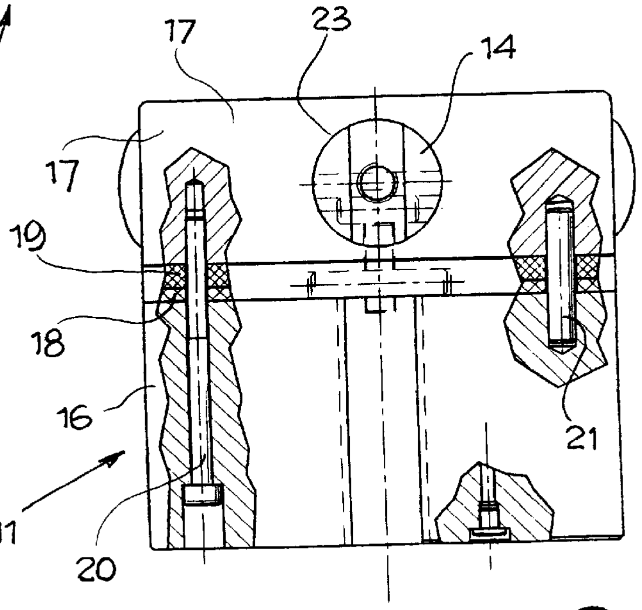
Fig. 2
Fig. 4
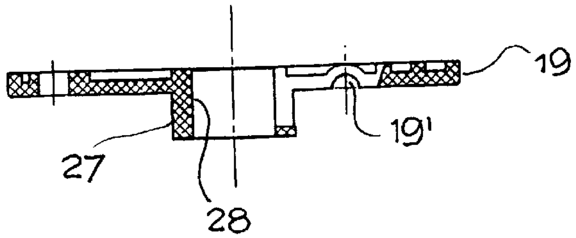
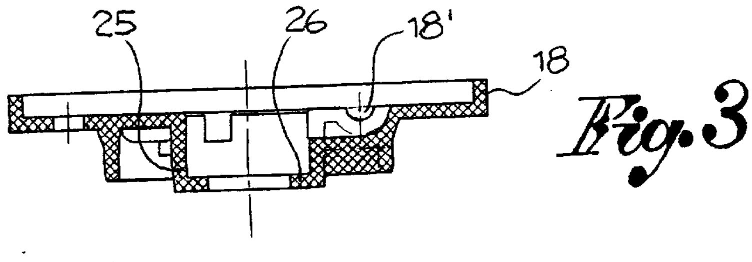
Fig. 3

PNEUMATIC GRIPPER WITH THREE SELF-CENTERING JAWS

FIELD OF THE INVENTION

The present invention pertains to the pneumatic grippers for pressing pieces in fixtures for automatic machine and/or manipulation operations, and specifically, it pertains to an improved pneumatic gripper with three jaws.

BACKGROUND OF THE INVENTION

Self-centering pneumatic grippers are already known which essentially comprise a support body, between coplanar, equidistant jaws which are guided and can be moved radially in the body between a closing position and an opening position, and a pneumatic piston accommodated in the body at right angles to the plane of the jaws and having a rod intended to control, by means of elbow-shaped relay rods, the simultaneous radial movements of the jaws when clamping and releasing a piece.

In the known pneumatic grippers of this type, the support body is made of metal and usually comprises at least two complementary elements, which together delimit a chamber for the piston for controlling the jaws. At least one of the elements of the body must be machined in order to produce seats and various accommodations for the rod of the piston, the jaws, the elbow-shaped relay rods, the pins for these rods, etc., the entire unit making the embodiment of the gripper rather complicated and difficult and its assembly laborious.

SUMMARY AND OBJECTS OF THE INVENTION

The primary object of the present invention is to propose a pneumatic gripper having a simpler and more economic embodiment and easier assembly thanks to the adoption of additional supports obtained from moldings made of a plastic material, which are joined in a complementary manner with the body made of metal and which already have in themselves seats and accommodations at least for some functional components of the gripper.

Advantageously, since they are obtained from molding, the additional supports made of the plastic material may be produced with surfaces, seats and accommodations with a high degree of precision, eliminating, moreover, a lot of machining of the body, thus also reducing the production times.

According to the invention, a gripper is provided, which has a body and jaws preferably three coplanar equidistant jaws), which are guided and can be moved radially in the body between a closing position and an opening position. A piston is accommodated in the body at right angles to the plane of the jaws. The piston has a rod which is intended to control, by means of elbow-shaped relay rods, the simultaneous radial movements of the jaws when clamping and releasing a piece. The body has two superimposed, complementary elements, made of metal, and two additional supports which are molded and formed of plastic material. The plastic supports are placed and clamped together between the said two superimposed elements. The two additional supports together define at least one guide seat for the rod of the piston, an accommodation for a seal for sealing around the rod and the seats for the pins carrying the elbow-shaped relay rods.

An exemplary embodiment of such a gripper will be described below in greater detail with reference to the attached indicative and non-limiting drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated. dr

BRIEF DESCRIPTION OF THE DRAWINGS

In the drawings:

FIG. 1 is a sectional view of the assembled pneumatic gripper;

FIG. 2 is a lateral view of a partial section of the gripper of FIG. 1;

FIG. 3 is a sectional view of one of the two additional separate supports; and FIG. 4 is a sectional view of another of the two additional separate supports.

DESCRIPTION OF THE PREFERRED EMBODIMENT

Referring to the drawings in particular, the gripper shown essentially comprises a cylindrical or prism-shaped body 11, a pneumatic piston 12 with a related rod 13, and three jaws 14, which are intended to carry the interchangeable pressing jaws (not shown).

The jaws 14 are mounted and slide radially in the body 11 between an expanded position and a contracted position. The pneumatic piston 12 is accommodated and is guided axially in the body 11 and controls, by means of its rod 13 and with the insertion of elbow-shaped rods 15, the movements of the jaws 14.

In greater detail, the body 11 comprises two superimposed, complementary elements 16, 17, made of metal, one on the bottom and the other on top, between which are arranged two additional supports 18, 19 molded in plastic material.

The two elements 16, 17 of the body and the two additional supports 18, 19 are fixed to one another in assembly by means of screws 20 and connecting pins 21 (FIG. 2).

In the bottom element 16 are provided a chamber 22 for tightly accommodating the piston 12 and passages for supplying a pressurized fluid to the chamber 22. In the top element 17, three holes 23 are formed for guiding the jaws 14 and a seat for a cover 24, preferably made of plastic material as well which rests on the jaws, contributing to their correct guidance.

The first 18 of the two additional supports forms a cover for closing the chamber 22 and it has centrally a hub 25 which ends at the bottom with an annular striking flange 26, which is turned towards the axis of the hub. The second 19 of the two additional supports rests on the first one and has centrally a neck 27, which rests on the inside of the hub 25 of the first support 18 and delimits an axial seat 28 for passing and guiding the rod 13 of the piston.

Between the lower, free end of the neck 27 and the annular striking flange 26 is arranged a seal 29 for sealing around the rod of the piston.

On the matching faces of the two additional supports 18, 19 are provided (FIGS. 3 and 4) three semicylindrical notches 18', 19', respectively, which, as a result of the superimposition of the two supports, are joined, delimiting three cylindrical seats. These seats are intended to receive the pins 30, forming the axes of oscillation of the elbow-shaped relay rods 15.

Thus, the additional supports 18, 19 integrate the body of the gripper and act as a cover for closing the chamber, in which the piston operates, as a guide for the rod of the piston, as a holder of the seal and as means for pivoting the relay rods 15 which engage, in the known manner, on the one hand, with the rod of the piston, and on the other hand, with the respective jaw to be controlled.

While specific embodiments of the invention have been shown and described in detail to illustrate the application of the principles of the invention, it will be understood that the invention may be embodied otherwise without departing from such principles.

What is claimed is:

1. A pneumatic gripper, comprising:

a body;

three coplanar, equidistant jaws guided to be movable radially in said body, between a closing position and an opening position;

a piston accommodated in said body at right angles to a plane of said jaws;

elbow-shaped relay rods;

a seal; and a rod connected to said piston for controlling, by means of the said elbow-shaped relay rods, simultaneous radial movements of said jaws when clamping and releasing a piece, said body including two superimposed complementary elements, made of metal, and two additional molded supports made of plastic material, placed and clamped together between said two superimposed elements, said two additional molded supports together define at least one guide seat for said rod, an accommodation for said seal for sealing around said rod and seats for pins carrying said elbow-shaped relay rods.

2. The pneumatic gripper in accordance with claim 1, wherein a first of said superimposed complementary elements of said body defines a chamber for accommodating and guiding said piston, and said two additional supports also act as a cover for closing the said chamber.

3. The pneumatic gripper in accordance with the claim 2 wherein a first of said two additional supports has centrally a hub which ends with an annular striking flange turned towards the center, and in which a second of said two additional supports rests on said first and has centrally a neck that is accommodated in said hub of said first additional support, delimiting a seat for guiding said rod.

4. The pneumatic gripper in accordance with claim 3, wherein a seal for sealing around said rod is arranged between a neck and an annular flange of said two additional supports.

5. The pneumatic gripper in accordance with claim 3, wherein said additional supports have on their matching faces semicylindrical notches, which are joined in order to define together seats for pins of said elbow-shaped relay rods.

6. The pneumatic gripper in accordance with the claim 1, wherein a first of said two additional supports has centrally a hub which ends with an annular striking flange turned towards the center, and in which a second of said two additional supports rests on said first and has centrally a neck that is accommodated in said hub of said first additional support, delimiting a seat for guiding said rod.

7. The pneumatic gripper in accordance with claim 6, wherein a seal for sealing around said rod is arranged between a neck and an annular flange of said two additional supports.

8. The pneumatic gripper in accordance with claim 6, wherein said additional supports have on their matching faces semicylindrical notches, which are joined in order to define together seats for pins of said elbow-shaped relay rods.

9. A pneumatic gripper, comprising:

a body;

a plurality of jaws guided to be movable radially in said body, between a closing position and an opening position;

a piston accommodated in said body at right angles to a plane of said jaws;

elbow-shaped relay rods;

a seal; and a rod connected to said piston for controlling, by means of the said elbow-shaped relay rods, simultaneous radial movements of said jaws when clamping and releasing a piece, said body including two superimposed complementary elements, made of metal and two additional molded supports made of plastic material, placed and clamped together between said two superimposed elements, said two additional molded supports together define at least one guide seat for said rod, an accommodation for said seal for sealing around said rod and seats for pins carrying said elbow-shaped relay rods.

10. The pneumatic gripper in accordance with claim 9, wherein a first of said superimposed complementary elements of said body defines a chamber for accommodating and guiding said piston, and said two additional supports also act as a cover for closing the said chamber.

11. The pneumatic gripper in accordance with the claim 9, wherein a first of said two additional supports has centrally a hub which ends with an annular striking flange turned towards the center, and in which a second of said two additional supports rests on said first and has centrally a neck that is accommodated in said hub of said first additional support, delimiting a seat for guiding said rod.

12. The pneumatic gripper in accordance with claim 11, wherein a seal for sealing around said rod is arranged between a neck and an annular flange of said two additional supports.

13. The pneumatic gripper in accordance with claim 11, wherein said additional supports have on their matching faces semicylindrical notches, which are joined in order to define together seats for pins of said elbow-shaped relay rods.

* * * * *